United States Patent
Kennedy et al.

(10) Patent No.: US 8,990,189 B2
(45) Date of Patent: Mar. 24, 2015

(54) DETERMINING RELEVANT CONTACTS BASED ON EXPERTISE AND AVAILABILITY

(75) Inventors: John Kennedy, Dublin (IE); Paula Prendergast, Dublin (IE); Ronan Redican, Dublin (IE); Carol S. Zimmet, Boxborough, MA (US)

(73) Assignee: International Business Machines Corporation, Armonk, NY (US)

( * ) Notice: Subject to any disclaimer, the term of this patent is extended or adjusted under 35 U.S.C. 154(b) by 27 days.

(21) Appl. No.: 13/597,303

(22) Filed: Aug. 29, 2012

(65) Prior Publication Data

US 2014/0067797 A1  Mar. 6, 2014

(51) Int. Cl.
*G06F 17/30* (2006.01)
*G06Q 10/06* (2012.01)
*G06Q 10/10* (2012.01)

(52) U.S. Cl.
CPC .... *G06Q 10/063112* (2013.01); *G06Q 10/1053* (2013.01); *G06Q 10/107* (2013.01)
USPC ........... 707/722; 707/706; 707/723; 707/736; 707/758; 707/781

(58) Field of Classification Search
USPC ................. 707/706, 722, 723, 736, 758, 781, 707/999.003, 999.006
See application file for complete search history.

(56) References Cited

U.S. PATENT DOCUMENTS

| | | | |
|---|---|---|---|
| 6,640,230 B1 | 10/2003 | Alexander et al. | |
| 6,731,323 B2 | 5/2004 | Doss et al. | |
| 6,988,128 B1 | 1/2006 | Alexander et al. | |
| 7,337,210 B2 | 2/2008 | Barsness | |
| 7,519,676 B2 | 4/2009 | Horvitz et al. | |
| 7,519,912 B2 | 4/2009 | Moody et al. | |
| 7,606,862 B2 | 10/2009 | Swearingen et al. | |
| 7,895,277 B2 | 2/2011 | Drory et al. | |
| 8,190,135 B2 | 5/2012 | Gupta et al. | |
| 2003/0046296 A1 | 3/2003 | Doss et al. | |
| 2003/0193558 A1 | 10/2003 | Doss et al. | |
| 2005/0055405 A1 | 3/2005 | Kaminsky et al. | |
| 2005/0055412 A1 | 3/2005 | Kaminsky et al. | |
| 2005/0165584 A1 | 7/2005 | Boody et al. | |
| 2005/0223075 A1 | 10/2005 | Swearingen et al. | |
| 2006/0136121 A1 | 6/2006 | Eisen | |
| 2006/0245391 A1 | 11/2006 | Vaidya et al. | |
| 2007/0179958 A1 | 8/2007 | Chen et al. | |
| 2007/0288580 A1 | 12/2007 | Kaminsky et al. | |

(Continued)

OTHER PUBLICATIONS

Disclosed Anonymously, "Method to View the Next Status of Contacts in Instant Messaging System", Jun. 12, 2010, IP.com [online], [retrieved on Feb. 21, 2012]. Retrieved from: Prior Art Database, IP.com number: IPCOM000196713D.

(Continued)

*Primary Examiner* — Syling Yen
(74) *Attorney, Agent, or Firm* — Maeve L. McCarthy

(57) ABSTRACT

A method for identifying knowledgeable and available contacts in a given instant messaging system for possible communication purposes. The method includes a computer receiving a keyword and searching for the keyword in correspondence files of users of the instant messaging system. Based on the results of the search, the computer identifies users that have used the keyword in their correspondence. The computer determines the availability of each of the identified users and ranks the identified users based on predefined criteria, which includes at least the determined availability.

15 Claims, 4 Drawing Sheets

(56) References Cited

U.S. PATENT DOCUMENTS

| | | |
|---|---|---|
| 2008/0096517 A1 | 4/2008 | Appleyard et al. |
| 2010/0169327 A1* | 7/2010 | Lindsay et al. ............... 707/750 |
| 2010/0175000 A1 | 7/2010 | Gupta et al. |
| 2010/0250692 A1 | 9/2010 | Kaminsky et al. |
| 2010/0332602 A1 | 12/2010 | O'Sullivan et al. |
| 2011/0040846 A1* | 2/2011 | Weinryb et al. ............... 709/206 |
| 2011/0295952 A1* | 12/2011 | Buyukkokten et al. ....... 709/204 |
| 2013/0103624 A1* | 4/2013 | Thieberger ..................... 706/12 |
| 2013/0318234 A1* | 11/2013 | Klemm et al. ................ 709/224 |

OTHER PUBLICATIONS

IBM, "Visual Indicator for Forthcoming Change of Presence Status", Mar. 16, 2009, IP.com [online], [retrieved on Feb. 21, 2012]. Retrieved from: Prior Art Database, IP.com number: IPCOM000180747D.

* cited by examiner

DETERMINING RELEVANT CONTACTS BASED ON EXPERTISE AND AVAILABILITY

FIELD OF THE INVENTION

The present invention relates generally to digital instant messaging systems, and more particularly to determining relevant contacts based on expertise and availability.

BACKGROUND

Instant messaging (IM) is a popular digital communication system that provides for real-time communication between users who are connected to such systems through an online or electronic networking environment, such as the Internet or a corporate intranet. One of the functions typically provided by an IM system is to inform the user whether selected other users are currently available to receive instant messages. In general, IM systems check whether a user is connected to the network, and if so, the user is deemed to be at his workstation and available to receive instant messages.

Some IM systems allow a user to manually set an IM status as "unavailable" or to enable the "I am away" feature of an IM client. This feature allows other IM users monitoring another's online presence to be informed that this person is currently not available, but gives no indication when the user may return. Some IM systems can detect if a user is no longer active by, for example, detecting when the screensaver is invoked on the user's workstation. When the screensaver is invoked, the IM client considers the user to be unavailable, but again, gives no indication when the user may return. E-mail systems typically provide an "away" feature as well. When an e-mail user configures his e-mail client to notify message senders that he is away, this provides a type of limited feedback to the sender, notifying him that an urgent message will not likely be acted upon with urgency. The e-mail user can set his "away" feature to include information regarding his location and return. Frequently, however, users forget to set the status, or find it too bothersome to use.

Instant messaging, voice/video communications and other forms of digital communication systems may provide users with the ability to provide instructions to various message senders regarding action to take in their absence. For example, one or more alternate contacts may be provided in an "I am away" message. However, conventional alternate contacts notifications are not user-friendly. For example, when a user is trying to reach a currently unavailable primary contact, they have to get the notification about the unavailability of the primary contact first, and then try to find the alternate contact to address their question. Additionally, the alternate contact provided may not have the proper expertise to deal with the user's question.

SUMMARY

Embodiments of the present invention provide a system, method, and program product to determine knowledgeable and available contacts in an instant messaging system. A computer receives a keyword and searches for the keyword in correspondence of users of the instant messaging system. The computer identifies, based on results of the search, a plurality of users having used the keyword in the correspondence. The computer determines an availability of each of the identified plurality of users and then ranks the plurality of users based on predefined criteria, the predefined criteria including at least the determined availability of each of the identified plurality of users.

DETAILED DESCRIPTION

Figure 1:
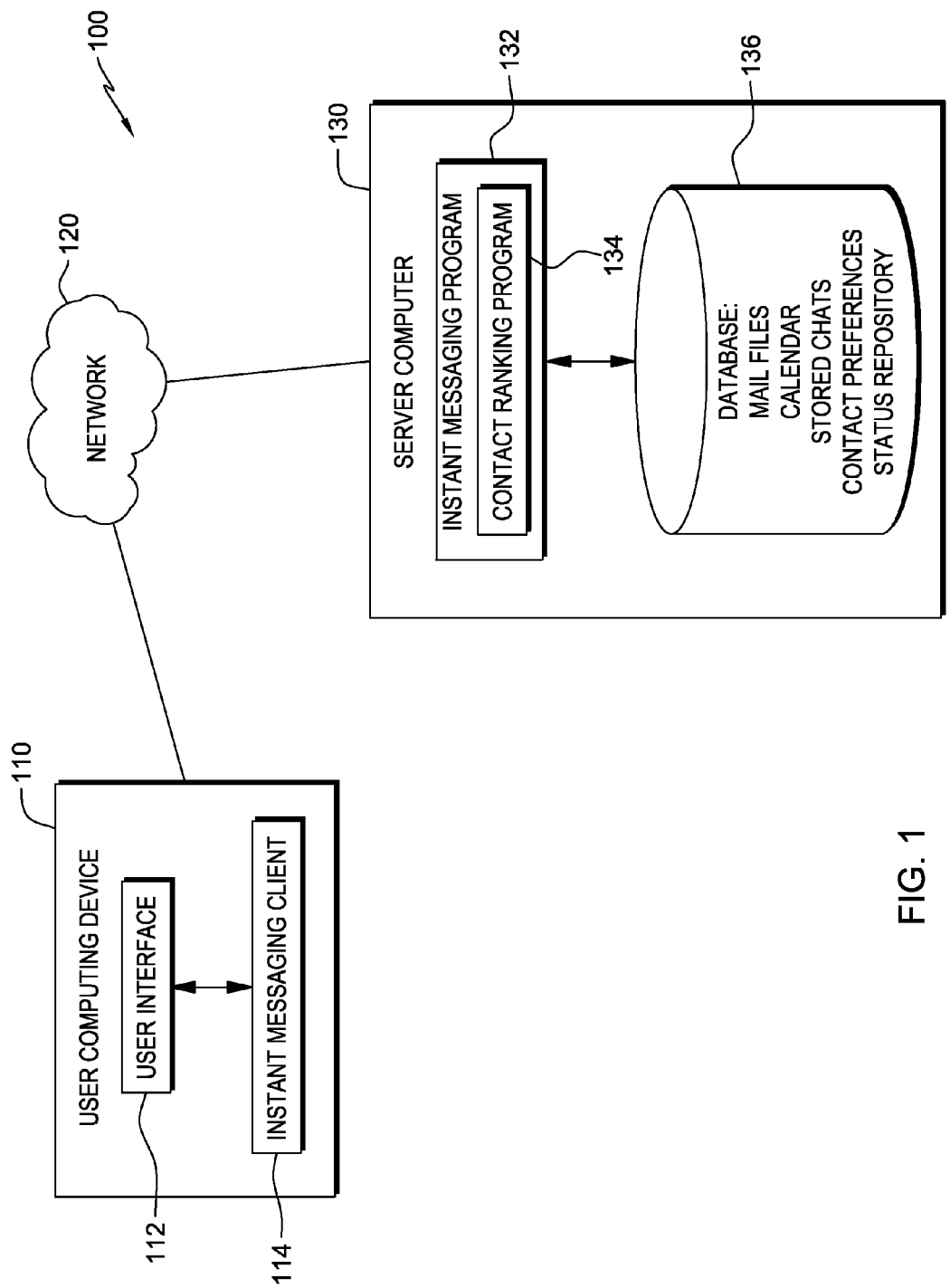
FIG. 1 is a functional block diagram of a distributed instant messaging environment, in accordance with an embodiment of the present invention.

As will be appreciated by one skilled in the art, aspects of the present invention may be embodied as a method, system, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to function in a particular manner, such that the instructions stored in the computer readable medium produce an article of manufacture including instructions which implement the function/act specified in the flowchart and/or block diagram block or blocks.

Embodiments of the present invention will now be described in detail with reference to the accompanying drawings. Embodiments of the invention are directed to an instant messaging (IM) communication system in which a user can enter subject matter keywords into an IM client interface, and a server-based IM application will respond with a results list of contacts ranked by expertise in the subject matter areas indicated by the entered keywords and the current availability of the contact. The user may then choose to communicate with one or more of the contacts in the ranked list regarding the subject matter area via traditional communication channels, such as IM, telephone, or email.

FIG. 1 is a functional block diagram of a distributed IM environment 100, in accordance with an embodiment of the present invention. Distributed IM environment 100 includes user computing device 110 and server computer 130, which are interconnected over network 120, and which at least provide for IM communication between an IM client residing on user computing device 110 and a server-based IM program residing on server computer 130.

Network 120 can be, for example, a local area network (LAN), a wide area network (WAN) such as the Internet, or a combination of the two, and can include wired, wireless, or fiber optic connections. In general, network 120 can be any combination of connections and protocols that will support IM communications between user computing device 110 and server computer 130.

In a preferred embodiment, user computing device 110 includes user interface 112 and instant messaging client 114. User interface 112 provides an interface to instant messaging client 114 that displays, for example, the IM user's contact list and allows the IM user to select a contact and establish an IM session. User interface 112 can also display text, user options, instructions for operation of instant messaging client 114, and accepts text input from a user of user computing device 110 for transmission to server computer 130. User interface 112 may be, for example, a graphical user interface (GUI) or a web user interface (WUI). In a preferred embodiment of the present invention, user interface 112 may include, for example, keyword search field 204 into which a user may enter keywords related to an area of expertise for which the user would like to identify knowledgeable contacts. Keyword search field 204 is depicted and described in further detail with respect to FIG. 2. Instant messaging client 114 offers a user of user computing device 110 online IM capabilities by communicating over a network, for example, network 120, with an IM service on a separate computer, e.g., instant messaging program 132 residing on server computer 130. Instant messaging client 114 may be either a browser-based client, which can be accessed by user computing device 110 when visiting a relevant web page, or instant messaging client 114 may be a separate program or integrated into other software products that can be installed on user computing device 110. Although user interface 112 is shown as being separate from instant messaging client 114, one of skill in the art will appreciate that in other embodiments, instant messaging client 114 can include user interface 112.

In various embodiments of the present invention, user computing device 110 can be a laptop computer, tablet computer, netbook computer, personal computer (PC), desktop computer, personal digital assistant (PDA), smart phone, or any programmable electronic device capable of communicating with server computer 130 via network 120. User computing device 110 may include internal and external components, as depicted and described in further detail with respect to FIG. 4.

Server computer 130 includes instant messaging program 132, which includes contact ranking program 134, and database 136. Server computer 130 may contain internal and external components, as depicted and described in further detail with respect to FIG. 4. In various embodiments of the present invention, server computer 130 may be any type of server computer, including a web server computer or a network server computer, a laptop computer, tablet computer, netbook computer, personal computer (PC), desktop computer, personal digital assistant (PDA), smart phone, or any programmable electronic device capable of communicating with user computing device 110 via network 120.

Instant messaging program 132 operates to communicate instant messages over a network, such as network 120, for exchange with an IM client, such as instant messaging client 114. Contact ranking program 134, the operation of which will be explained in more detail with regard to FIG. 3, can perform a keyword search of information stored in database 136, based on one or more keywords entered by a user into keyword search field 204, included within instant messaging client 114 and displayed on user interface 112 as shown on FIG. 2, to identify and rank qualified contacts within a given organization for communication on certain topics. Contact ranking program 134 also determines the availability status of the identified contacts, based on information in database 136, and displays a best and most relevant contacts list, ranked in terms of expertise and availability, to the user. While FIG. 1 depicts instant messaging program 132 as including contact ranking program 134, one of skill in the art will appreciate that, in other embodiments, contact ranking program 134 is external to, and can communicate with, instant messaging program 132. Further, although contact ranking program 134 is depicted as one program in FIG. 1, one of skill in the art will appreciate that, in other embodiments, contact ranking program 134 may be segmented into modules to perform the predefined functions of a keyword search, an availability determination and a ranking determination.

In a preferred embodiment, database 136 contains real-time and historical information associated with each contact within a given organization connected to server computer 130 via network 120. Database 136 may contain correspondence such as contact mail files, previously stored chat exchanges from online chat sessions, messages sent within the instant messaging system and discussion forum postings. Additionally, database 136 may contain a contact's electronic calendars and contact preferences. A contact's preferences may include the contact's manually set explicit IM status messages for unavailable time, for example, "I am in a meeting until 2 pm EST on June 26", or differing settings for an IM status or alternate contact information based on which contact may be attempting communication. For example, a contact may desire to include the location of a lunch meeting when a co-worker is seeking the information, but not so for a friend.

Also stored in database 136 may be a status repository, which might include details of a contact's previous IM status messages, alternate contact information such as an alternate phone number, information regarding the contact's previous availability history, which may include weekly engagements, activities and trends, and information regarding how long the weekly engagement, activity or trend may take. For example, a contact's trend may be that between noon and 1 pm every day for a month the contact's instant messaging client is inactive. The one hour period may be stored in the status repository as a one hour lunch. A user can set, in user options, for example, whether contact ranking program 134 retrieves contact status information from the status repository for the previous seven days, previous month or any number of previous weeks. In a preferred embodiment, database 136 may be located on server computer 130. In other embodiments, database 136 may be located on a storage device accessible to server computer 130 via network 120.

Figure 2:
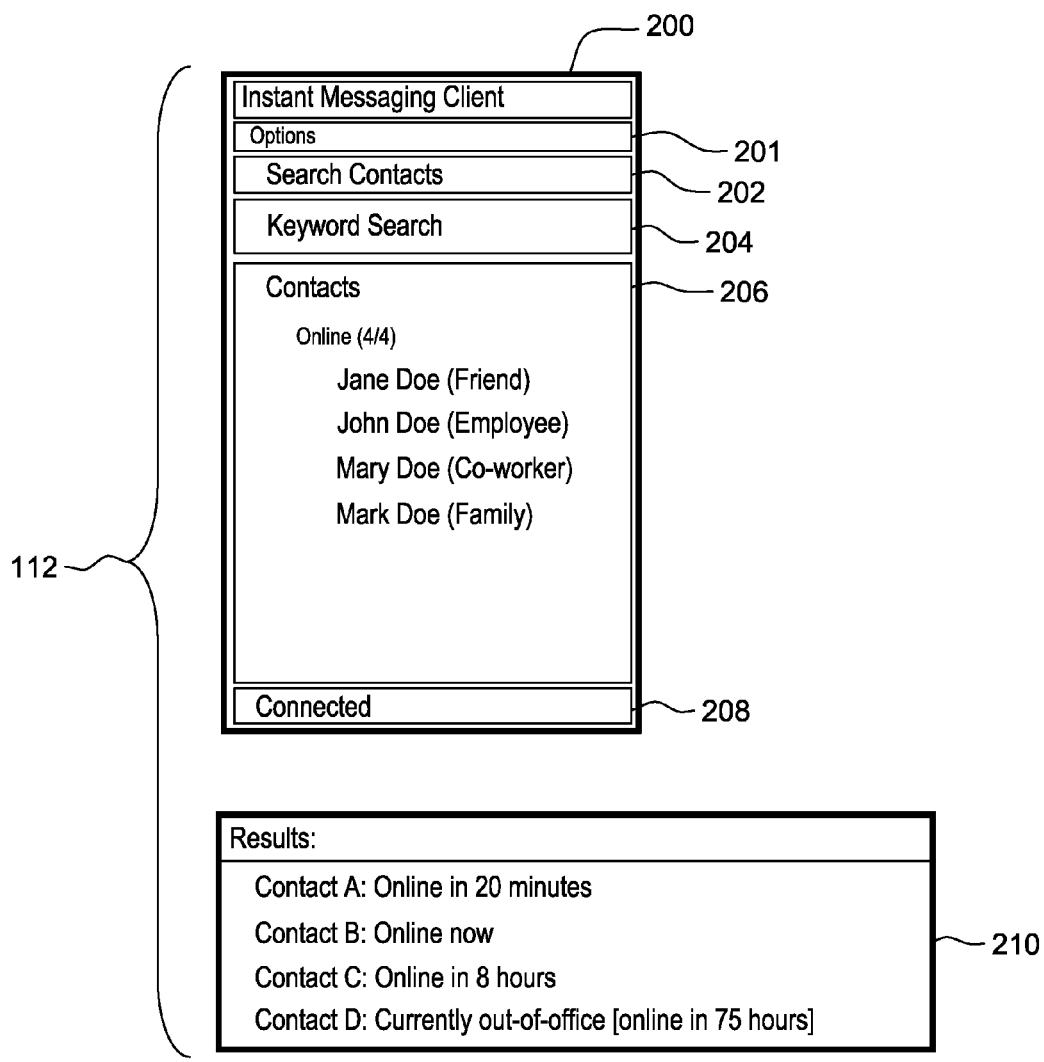
FIG. 2 provides an exemplary depiction of an instant messaging client interface and displayed results from the contact ranking program of FIG. 1, in accordance with an embodiment of the present invention.

FIG. 2 provides an exemplary depiction of aspects of a user interface, for example user interface 112, featuring an instant messaging client interface 200 of instant messaging client 114 and results 210 transmitted by contact ranking program 134 to instant messaging client 114, in accordance with an embodiment of the present invention.

Instant messaging client interface 200 is representative of a typical user interface for interaction with instant messaging client 114. Instant messaging client interface 200 may include options 201, which allows a user to access general menu options, such as setting user-preferences, selecting display options, changing text size or font within an IM client or accessing help features for the IM client. Instant messaging client interface 200 also may include a search contacts field 202, allowing a user to search, by name, for contacts already known to the user within a given organization, and a contacts list 206 showing contacts a user communicates with on a regular basis who are currently online. Both search contacts field 202 and contacts list 206 provide opportunities for a user to initiate communication with a known contact, for example, a co-worker named Mary Doe. Additionally, connection 208 shows a user his or her current connectivity status, either connected or disconnected. When connection 208 is shown as "connected", for example, instant messaging client 114 on user computing device 110 is connected to network 120, and therefore is able to access contact ranking program 134 and database 136 on server computer 130.

In a preferred embodiment of the present invention, instant messaging client interface 200 also includes keyword search field 204, which allows a user to input one or more keywords related to an area of expertise, for example, "Windows." Using the keyword entered into keyword search field 204, contact ranking program 134 performs a search of the information stored in database 136 for each contact and identifies contacts with the highest incidence of the keywords in the contact's correspondence. In options 201 of instant messaging client 114, the user may, for example, set the number of contacts to be identified and returned by contact ranking program 134. Contact ranking program 134 then determines the availability of each of the identified contacts, either based on explicit messages manually set by the contact or, if a contact is not currently available, based on predictive assumptions formed using the contact's previous activities and availability trends determined from information contained in database 136.

Results 210 displays the results transmitted to instant messaging client 114 by contact ranking program 134, which can be ranked and displayed to the user based on parameters the user may set in options 201. For example, a user may decide that only the top four contacts with the most keyword hits should be displayed, and that the contact with the highest incidence of the keyword should always be listed first in the displayed results. The user may also decide that remaining contacts should be listed by each contact's availability, and not by most keyword hits. For example, as shown in FIG. 2, results 210 displays contact A, the contact with the most keyword hits, first. Contact B is displayed next, based on current availability, even though contact B may not be the user with the next highest number of keyword hits. Using the displayed results 210, a user may then decide immediately whether to wait to communicate with the contact with the most expertise, or decide that communication with the most available contact is more desirable. In alternate embodiments, contact ranking program 134 may transmit results 210 to instant messaging client 114 within an IM chat window viewable by the user.

Figure 3:
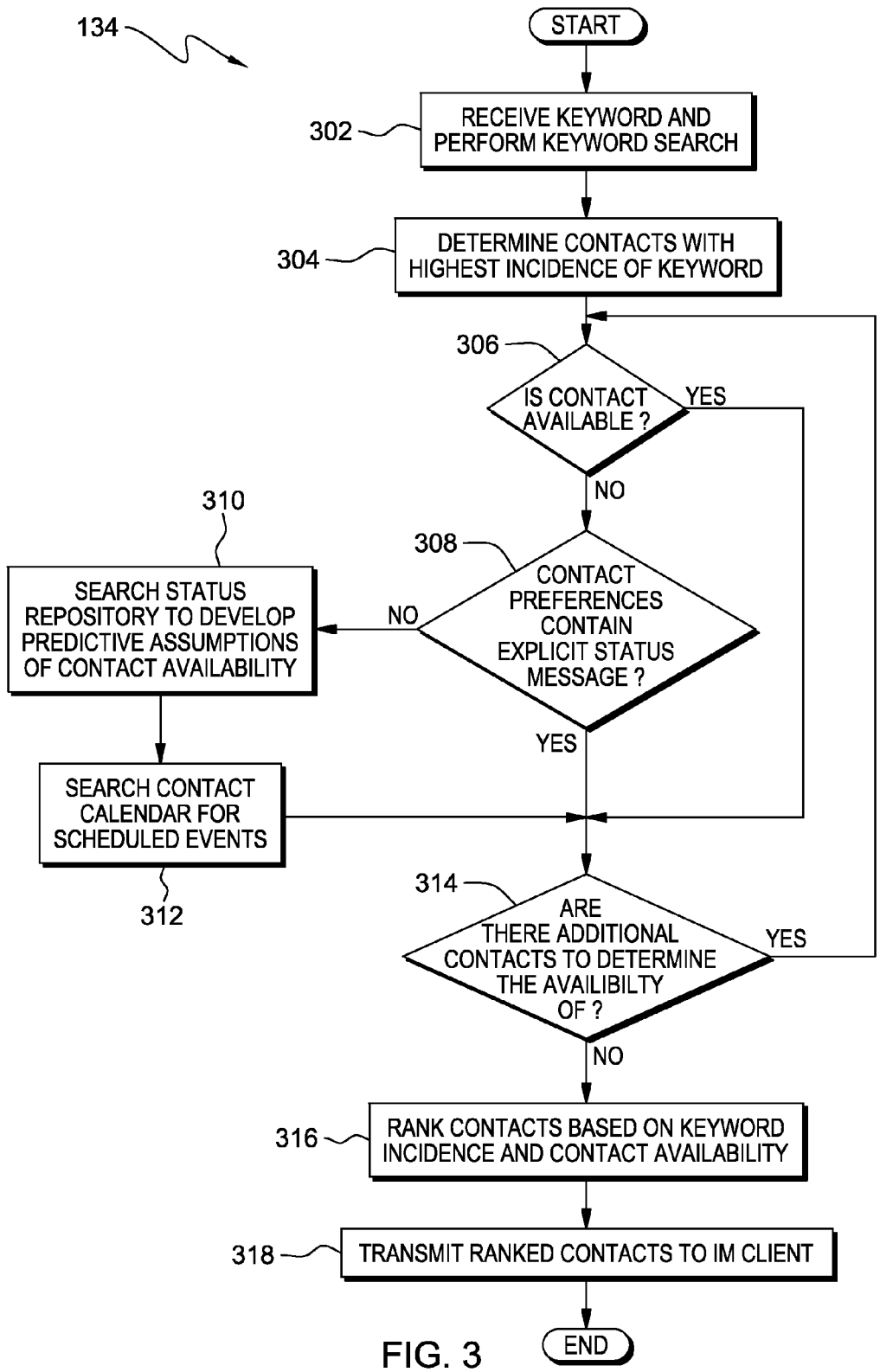
FIG. 3 is a flowchart illustrating the steps of the contact ranking program of FIG. 1, in accordance with an embodiment of the present invention.

FIG. 3 is a flowchart illustrating the steps of contact ranking program 134 for performing a keyword search and availability determination to identify and rank qualified and available contacts for communication on a specific topic related to the keyword, in accordance with an embodiment of the present invention.

Contact ranking program 134 receives one or more user-provided keywords and performs a search for appearances of the one or more keywords (step 302). In a preferred embodiment, a user enters one or more keywords related to an area of expertise for which the user would like to identify a knowledgeable contact into keyword search field 204 within instant messaging client 114. Contact ranking program 134 performs a search for appearances of the keywords in contact-related information stored in database 136, for example, mail files, previous chat exchanges and discussion forum postings. The search is performed on information for various contacts and other users of instant messaging program 132, typically within a given organization and connected to network 120.

Contact ranking program 134 determines the contacts with the highest incidence of the keywords in their respective stored mail files, discussion forum postings, or chat exchanges (step 304). Expertise and work experience in a selected topic may be determined by the extent a keyword related to the topic appears in a contact's correspondence. In various embodiments, the location of the keyword in an e-mail may signify greater expertise and understanding of a topic. For example, a keyword used in a subject line or first paragraph may be considered a more significant location than a keyword appearing first towards the end of an e-mail, and may indicate the contact possesses greater expertise in the area of interest.

Contact ranking program 134 determines whether each of the contacts returned are currently available (decision block 306). If a contact is currently available (decision block 306, "yes" branch), contact ranking program 134 proceeds with the availability information to step 314. If a contact is not currently available (decision block 306, "no" branch), contact ranking program 134 proceeds to determine whether the contact has manually set, in contact preferences stored in database 136, an explicit status message to be displayed (step 308). An explicit status message may contain, for example, information regarding the contact's whereabouts, time of return and/or provide alternate contacts for certain areas of expertise. In certain embodiments, the present invention may include a function that integrates availability settings already set in another digital communication system, such as an out-of-office message set in an e-mail system, and contact ranking program 134 may retrieve the availability setting from the other digital communication system. If a contact has manually set an explicit status message (decision block 308, "yes" branch), contact ranking program 134 proceeds to step 314.

If a contact has not manually set an explicit status message (decision block 308, "no" branch), contact ranking program 134 will search the contact's status repository, stored in database 136, in order to determine a predictive assumption for the contact's availability (step 310). The contact's status repository may contain, for example, previously used explicit status messages, records of idle, away or unavailable time, or general information on weekly activities or daily trends of the contact. Contact ranking program 134 may use any of the information found in a contact's status repository to predict the contact's availability. Additionally, contact ranking program 134 also searches each contact's calendar, which is stored in database 136, for scheduled events, such as meetings or appointments (step 312). Availability can be determined as either the contact is currently offline, currently online and available, the contact is online but has manually set an explicit status message regarding his or her availability, or contact ranking program 134 determines the availability based on predictive assumptions and/or scheduled calendar events.

Contact ranking program 134 determines whether there are any additional identified contacts for which availability must be determined (decision block 314). If additional identified contacts remain (decision block 314, "yes" branch), contact ranking program 134 returns to step 306 and repeats the availability determination for each identified contact. If there are no more identified contacts (decision block 314, "no" branch), contact ranking program 134 proceeds to step 316.

Based on predefined criteria, including the determined availability of each identified contact and an incidence count of the topic keywords from previous steps, contact ranking program 134 ranks the identified contacts (step 316). The extent of a contact's exposure to an area of expertise can be evidenced by repeated usage and appearance of a keyword related to the area of expertise in a contact's correspondence. Contacts may be ranked according to preferences set by the user. For example, the user may desire only those that are available, regardless of whether the available contact had the most keyword hits or not. Or, the user may want only the contact with the highest level of expertise, even though that contact may not be available for several days. The ranked contacts are then transmitted to instant messaging client 114 in the form of results 210, for display on user computing device 110 via user interface 112 (step 318).

Figure 4:
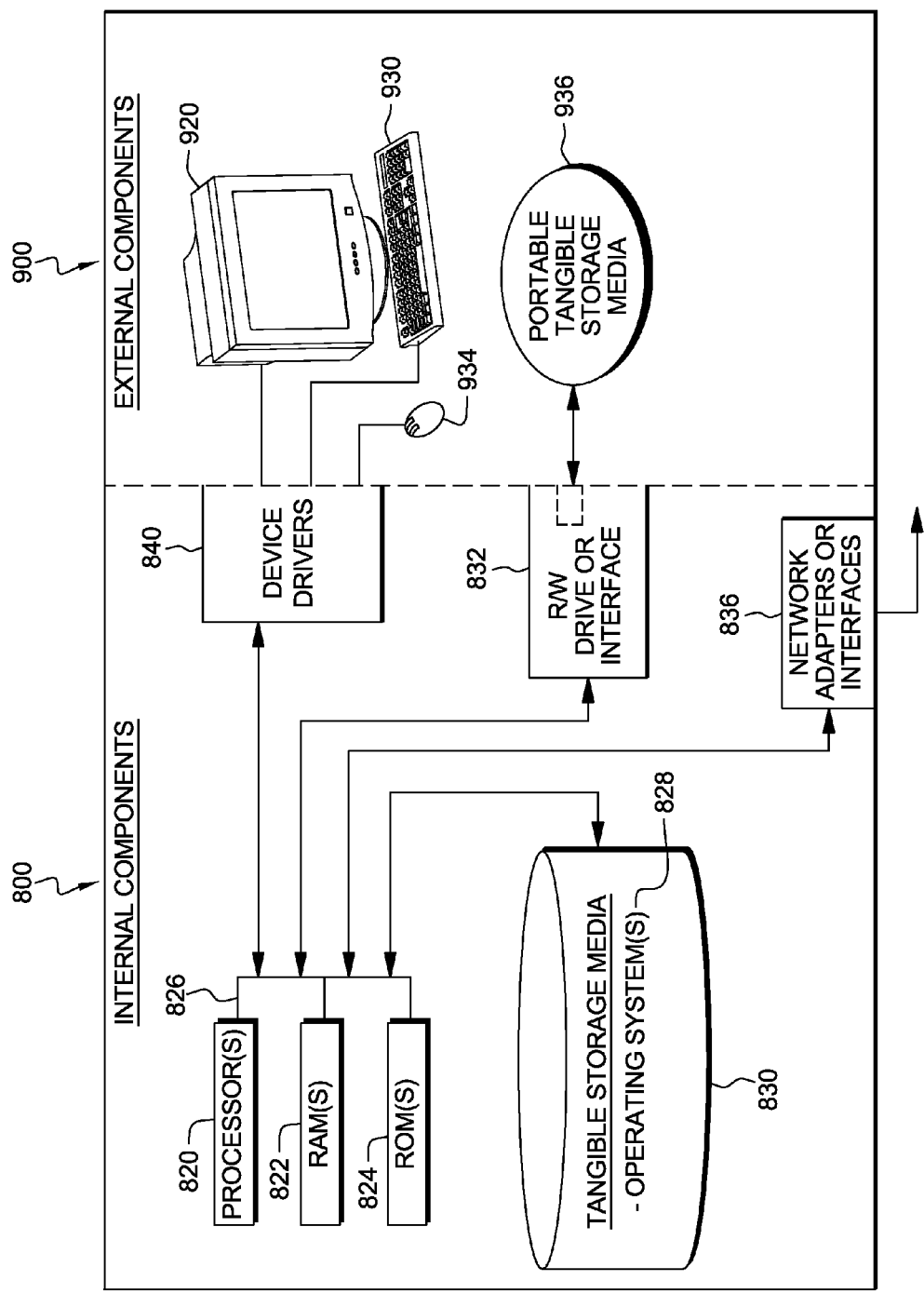
FIG. 4 shows a block diagram of internal components and external components of a data processing system, such as the user computing device or server computer of FIG. 1, in accordance with an embodiment of the present invention.

FIG. 4 shows a block diagram of the internal components 800 and external components 900 of a data processing system, such as user computing device 110 or server computer 130, in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multi-processor systems, microprocessor-based systems, network PCs, minicomputer systems, and distributed cloud computing environments that include any of the above systems or devices.

User computing device 110 and server computer 130 include respective sets of internal components 800 and external components 900, illustrated in FIG. 4. Each of the sets of internal components 800 includes one or more processors 820, one or more computer-readable RAMs 822 and one or more computer-readable ROMs 824 on one or more buses 826, and one or more operating systems 828 and one or more computer-readable tangible storage media 830. The one or more operating systems 828 are stored on one or more of the respective computer-readable tangible storage media 830 for execution by one or more of the respective processors 820 via one or more of the respective RAMs 822 (which typically include cache memory). User interface 112 and instant messaging client 114 on user computing device 110 and instant messaging program 132 and contact ranking program 134 on server computer 130 are stored on one or more of the respective computer-readable tangible storage media 830 of internal components 800 for execution by one or more of processors 820 of internal components 800 via one or more of the RAMs 822 of internal components 800. In the embodiment illustrated in FIG. 4, each of the computer-readable tangible storage media 830 is a magnetic disk storage device of an internal hard drive. Alternatively, each of the computer-readable tangible storage media 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more portable computer-readable tangible storage media 936 such as a CD-ROM, DVD, memory stick, magnetic tape, magnetic disk, optical disk or semiconductor storage device. User interface 112 and instant messaging client 114 on user computing device 110 and instant messaging program 132 and contact ranking program 134 on server computer 130 can be stored on one or more of portable computer-readable tangible storage media 936 of external components 900, read via the R/W drive or interface 832 of internal components 800 and loaded into hard drive 830 of internal components 800.

Each set of internal components 800 can also include network adapters or interfaces 836 such as TCP/IP adapter cards, wireless wi-fi interface cards, 3G or 4G wireless interface cards or other wired or wireless communication links. User interface 112 and instant messaging client 114 in user computing device 110 and instant messaging program 132 and contact ranking program 134 in server computer 130 can be downloaded to user computing device 110 and server computer 130, respectively, from an external computer via a network (for example, the Internet, a local area network or other, wide area network) and respective network adapters or interfaces 836. From the network adapters or interfaces 836, user interface 112 and instant messaging client 114 in user computing device 110 and instant messaging program 132 and contact ranking program 134 in server computer 130 are loaded into the respective hard drive 830. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Alternatively, computer display monitor 920 may be an incorporated display screen, such as is used in tablet computers and smart phones. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage medium 830 and/or ROM 824).

The flowcharts and block diagrams in the Figures illustrate the architecture, functionality, and operation of possible implementations of methods, systems and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Based on the foregoing, method, computer system, and program product have been disclosed in accordance with the present invention. However, numerous modifications and substitutions can be made without deviating from the scope of the present invention. Such modifications and substitutions that may be apparent to a person skilled in the art of the invention are intended to be included within the scope of the invention as defined by the accompanying claims. The foregoing description is not intended to be exhaustive nor to limit the invention to the precise form disclosed. Therefore, the present invention has been disclosed by way of example and not limitation.

What is claimed is:

1. A computer method for determining knowledgeable and available contacts in an instant messaging system, the method comprising the actions of:
   receiving a keyword related to an area of expertise;
   searching for the keyword in correspondence of users of an instant messaging system, the correspondence including real-time and historical information associated with each user of the instant messaging system;
   identifying, based on results of the searching, a plurality of users having used the keyword in the correspondence;
   determining an availability of each of the identified plurality of users; and
   ranking the identified plurality of users based on predefined criteria, the predefined criteria including at least one of the determined availability of each of the identified plurality of users, and an incidence of the keyword in correspondence of each of the identified plurality of users, the incidence including both a number and a location of the keyword in the correspondence, wherein the keyword located near a beginning of the correspondence indicates a greater expertise in the area of expertise than the keyword located near an end of the correspondence.

2. The method of claim 1, wherein the step of determining an availability further comprises determining an availability of each of the identified plurality of users based on information associated with one or more of each of the user's electronic calendars, current and previous instant messaging status messages, and previous availability history.

3. The method of claim 1, wherein the step of ranking the identified plurality of users includes receiving a preference for at least one of the predefined criteria.

4. The method of claim 1, wherein the correspondence includes one or more of: mail files, instant messaging system messages, online chat session exchanges, and discussion forum postings.

5. The method of claim 1, further comprising displaying the identified plurality of users according to the ranking.

6. A computer program product to determine knowledgeable and available contacts in an instant messaging system, the computer program product comprising:
   one or more computer-readable storage devices and program instructions stored on at least one of the one or more tangible storage devices, the program instructions comprising:
   program instructions to receive a keyword related to an area of expertise;
   program instructions to search for the keyword in correspondence of users of an instant messaging system, the correspondence including real-time and historical information associated with each user of the instant messaging system;
   program instructions to identify, based on results of the search, a plurality of users having used the keyword in the correspondence;
   program instructions to determine an availability of each of the identified plurality of users; and
   program instructions to rank the identified plurality of users based on predefined criteria, the predefined criteria including at least one of the determined availability of each of the identified plurality of users and an incidence of the keyword in correspondence of each of the identified plurality of users, the incidence including both a number and a location of the keyword in the correspondence, wherein the keyword located near a beginning of the correspondence indicates a greater expertise in the area of expertise than the keyword located near an end of the correspondence.

7. The computer program product of claim 6, wherein the program instructions to determine an availability further comprise program instructions to determine an availability of each of the identified plurality of users based on information associated with one or more of each of the user's electronic calendars, current and previous instant messaging status messages, and previous availability history.

8. The computer program product of claim 6, wherein the program instructions to rank the identified plurality of users include program instructions to receive a preference for at least one of the predefined criteria.

9. The computer program product of claim 6, wherein the correspondence includes one or more of: mail files, instant messaging system messages, online chat session exchanges, and discussion forum postings.

10. The computer program product of claim 6, further comprising program instructions to display the identified plurality of users according to the ranking.

11. A computer system to determine knowledgeable and available contacts in an instant messaging system, the computer system comprising:
one or more processors, one or more computer-readable memories, one or more computer-readable tangible storage devices, and program instructions stored on at least one of the one or more storage devices for execution by at least one of the one or more processors via at least one of the one or more memories, the program instructions comprising:
program instructions to receive a keyword related to an area of expertise;
program instructions to search for the keyword in correspondence of users of an instant messaging system, the correspondence including real-time and historical information associated with each user of the instant messaging system;
program instructions to identify, based on results of the search, a plurality of users having used the keyword in the correspondence;
program instructions to determine an availability of each of the identified plurality of users; and
program instructions to rank the identified plurality of users based on predefined criteria, the predefined criteria including at least one of the determined availability of each of the identified plurality of users and an incidence of the keyword in correspondence of each of the identified plurality of users, the incidence including both a number and a location of the keyword in the correspondence, wherein the keyword located near a beginning of the correspondence indicates a greater expertise in the area of expertise than the keyword located near an end of the correspondence.

12. The computer system of claim 11, wherein the program instructions to determine an availability further comprise program instructions to determine an availability of each of the identified plurality of users based on information associated with one or more of each of the user's electronic calendars, current and previous instant messaging status messages, and previous availability history.

13. The computer system of claim 11, wherein the program instructions to rank the identified plurality of users include program instructions to receive a preference for at least one of the predefined criteria.

14. The computer system of claim 11, wherein the correspondence includes one or more of: mail files, instant messaging system messages, online chat session exchanges, and discussion forum postings.

15. The computer system of claim 11, further comprising program instructions to display the identified plurality of users according to the ranking.

\* \* \* \* \*